United States Patent [19]
Siemons

[11] Patent Number: 5,839,321
[45] Date of Patent: Nov. 24, 1998

[54] BACKLASH COMPENSATING ASSEMBLY

[75] Inventor: Alexander H. Siemons, San Francisco, Calif.

[73] Assignee: Ball Screw & Actuators Co., San Jose, Calif.

[21] Appl. No.: 857,972

[22] Filed: May 16, 1997

[51] Int. Cl.[6] ............................. F16H 55/18; F16H 25/24
[52] U.S. Cl. ................... 74/441; 74/459; 267/172
[58] Field of Search ................ 74/409, 441, 459; 267/172

[56] References Cited

U.S. PATENT DOCUMENTS

| | | | |
|---|---|---|---|
| Re. 31,713 | 10/1984 | Erikson et al. | 74/441 |
| 2,205,634 | 6/1940 | Sizer | 74/441 X |
| 2,385,194 | 9/1945 | Carroll | 74/441 |
| 2,610,519 | 9/1952 | Rokos | 74/441 |
| 2,615,348 | 10/1952 | Gasser | 74/441 |
| 2,679,168 | 5/1954 | Rokos | 74/441 |
| 2,690,682 | 10/1954 | Passman | 74/441 |
| 2,857,778 | 10/1958 | Rokos | 74/441 |
| 3,094,011 | 6/1963 | Bradley | 74/441 |
| 3,186,249 | 6/1965 | Lanzenberger | 74/409 |
| 3,479,897 | 11/1969 | Holthofer | 74/441 |
| 3,720,116 | 3/1973 | Better et al. | 74/459 |
| 4,131,031 | 12/1978 | Erikson et al. | 74/441 |
| 4,210,033 | 7/1980 | Erikson et al. | 74/441 X |
| 4,249,426 | 2/1981 | Erikson et al. | 74/441 |
| 4,392,757 | 7/1983 | Denny et al. | 74/441 X |
| 4,433,590 | 2/1984 | Benoit et al. | 74/409 |
| 4,434,677 | 3/1984 | Linley, Jr. | 74/409 |
| 4,589,298 | 5/1986 | Meyer et al. | 74/441 |
| 4,679,457 | 7/1987 | Nishikawa et al. | 74/441 |
| 4,691,582 | 9/1987 | Weyer | 74/409 |
| 4,753,122 | 6/1988 | Nishikawa et al. | 74/441 X |
| 4,872,795 | 10/1989 | Davis | 74/441 X |
| 4,896,552 | 1/1990 | Virga | 74/89.15 |
| 4,954,032 | 9/1990 | Morales | 74/424.8 A X |
| 4,974,464 | 12/1990 | Erikson et al. | 74/409 X |
| 5,522,688 | 6/1996 | Reh | 411/536 |

*Primary Examiner*—Allan D. Herrmann
*Attorney, Agent, or Firm*—Watts, Fisher, Hoffmann, & Heinke Co. L.P.A.

[57] ABSTRACT

An assembly that automatically compensates for backlash. The assembly includes two nut portions engaged to prevent relative rotation but permit relative movement in an axial direction. A sleeve is disposed between the nut portions with the opposite ends of the sleeve abutting annular rims formed on the nut portions. One end of the sleeve has at least one helical ramp extending around the its periphery that abuts a complementarily shaped ramp formed on the annular rim of one of the nut portions, while the other end of the sleeve has a flat outer surface abutting the flat annular rim of the other nut portion. A torsion spring has tangs secured to the sleeve and one of the nut portions and biases the sleeve rotatively with respect to the nut portions. As backlash arises between the threads of the nut portions and those of a lead screw engaged with the nut portions, rotation of the sleeve causes the ramps on the sleeve to cam against the ramps on the one nut portion to move the nut portions axially away from each other, thereby forcing the threads of the nut portions into engagement with the threads of the lead screw.

20 Claims, 5 Drawing Sheets

BACKLASH COMPENSATING ASSEMBLY

BACKGROUND OF THE INVENTION

1. Field of the Invention

The invention relates to an assembly that automatically compensates for backlash between machine parts.

2. Description of Related Art

It is known in the prior art to provide a mechanism that compensates or takes up backlash, i.e., play or lost motion existing between machine parts fitted together, for example, play between gears, threaded connectors, etc. Many prior art mechanisms have been specifically designed to remove backlash that occurs in actuators of the split nut type. These actuators typically comprise a rotatable lead screw and a split nut assembly threaded on the screw. The screw is rotated and the split nut assembly, which is usually restrained from rotating about the screw, travels in a linear direction along the screw.

One reason it is desirable to take up backlash is to ensure accurate positioning of the split nut assembly and a movable part or component carried by the nut assembly. For example, backlash, if not compensated for, can prevent or adversely affect obtaining high resolution in the many different kinds of devices that utilize such actuators. It is often advantageous to remove backlash upon initially installing a split nut assembly on the screw, and to also remove backlash that may arise subsequent to installation due to wearing of the threads of the nut or screw.

Conventional anti-backlash nut assemblies usually include two split nut halves that are biased into engagement with the screw threads in a radial or axial direction, typically by a compression spring. One known arrangement utilizes a compression spring to preload the nut assembly in an axial direction to force the threads of the nut portions against the screw threads. During operation, however, the amount of the preload force applied by the spring may be overcome by forces arising from increased loading, which may result in one of the nut halves moving out of tight engagement with the screw threads. This creates backlash and has a detrimental effect on the ability to precisely detect or control the position of the nut assembly.

In addition, the axial force exerted against the nut halves by a compression spring usually increases drag torque between the nut and screw which may result in increased thread wear and motor torque requirements. Further, utilizing a compression spring between the nut halves also reduces overall system stiffness in that the spring, which is flexible to some extent, serves as the member that preloads the nut halves. Moreover, many conventional backlash compensating assemblies include a number of parts and are relatively expensive to manufacture. Accordingly, there is room in the art for improved assemblies that compensate for backlash between machine parts.

SUMMARY OF THE INVENTION

The invention provides an assembly that automatically compensates for backlash between machine parts, provides a system with a high level of axial stiffness while inducing a relatively minimal increase in drag torque, and is easier and less costly to manufacture than many conventional assemblies.

The backlash compensating assembly includes a first member having a bore and a second member having a bore, the bores being aligned to receive a shaft. The first and second members are non-rotatably coupled but are relatively movable in an axial direction. A mechanism for applying a preload forces the first and second members apart to take up backlash between the members on the shaft.

In the preferred embodiment, the mechanism for applying a preload comprises a sleeve positioned between the first and second members so as to be rotatable relative thereto. The sleeve has an end including at least one cam surface that abuts a corresponding surface provided on one of the first and second members. The assembly is provided with means for biasing the sleeve rotatively with respect to the first and second members, which, in the preferred embodiment, comprises a torsion spring secured to the sleeve and one of the members. The spring forces the sleeve to rotate such that the one end of the sleeve cams the corresponding surface of the one member to move the one member in an axial direction with respect to the other member, thereby compensating for play between the members and the shaft.

In the preferred embodiment, the first and second members are threaded nut portions engaged with a threaded drive shaft. The assembly maintains the nut portions in engagement with the threads of the drive shaft to compensate for backlash between the threads of the respective components which may arise, for example, due to thread wear caused by prolonged use.

DETAILED DESCRIPTION OF PREFERRED EMBODIMENTS

The backlash compensating assembly of the present invention is suitable for taking up backlash, i.e., play or lost motion between machine parts fitted together, in various types of devices where it is desirable, for one reason or another, to eliminate play between two members mounted on a shaft, rod or other support. For example, the invention may be utilized to remove backlash between spaced members movably mounted on a shaft, backlash between bearings or bushings rotatably supporting a shaft, backlash between a lead screw and travelling nut, etc. As such, it should be recognized that the invention is not limited to any specific application or environment.

Figures 1, 2:
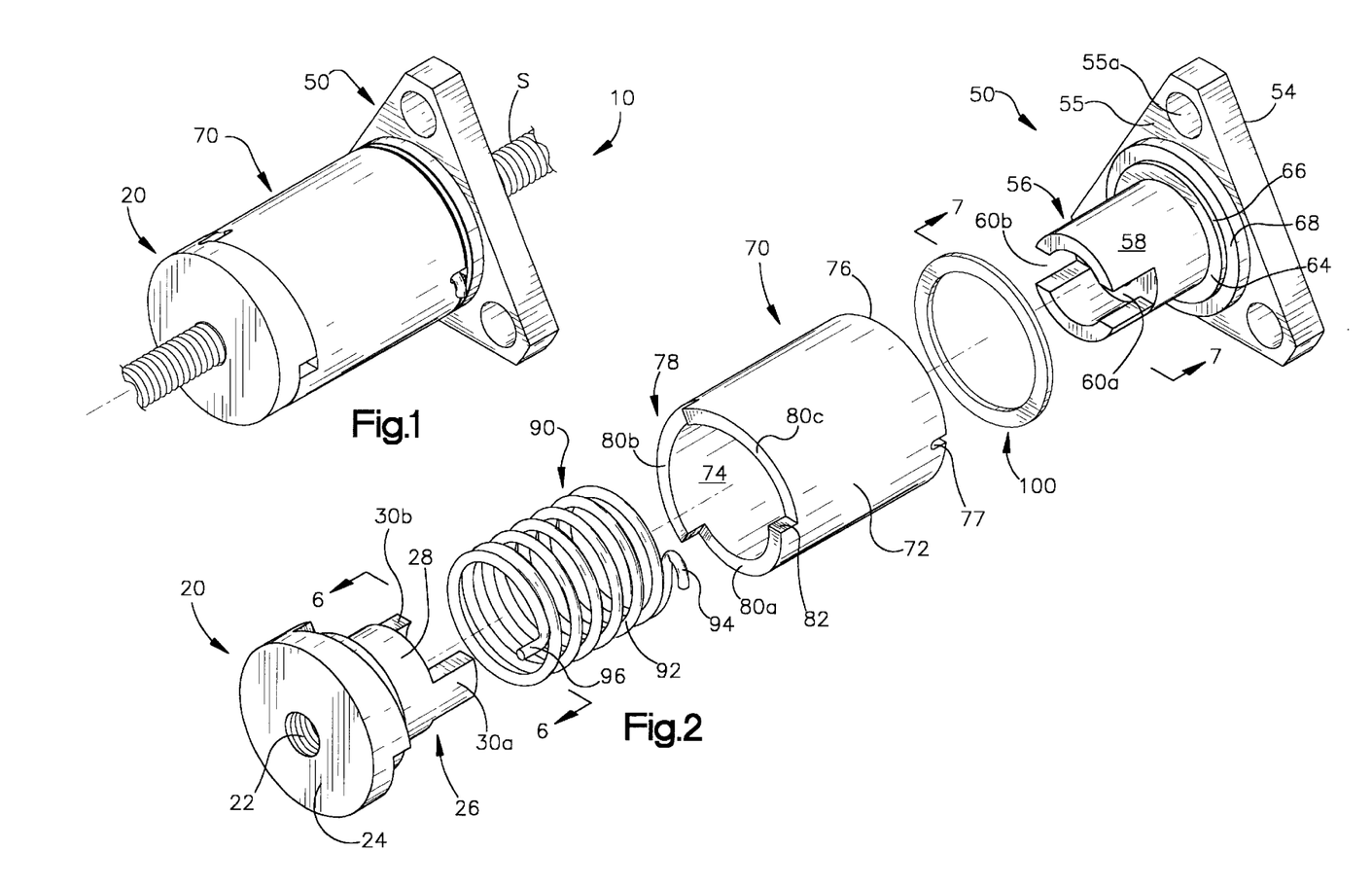
FIG. 1 is a perspective view of a backlash compensating assembly constructed according to one embodiment of the invention.
FIG. 2 is an exploded perspective view of the assembly shown in FIG. 1.

Referring to FIGS. 1 and 2, a backlash compensating assembly constructed according to one embodiment of the invention is indicated generally by the reference numeral 10. The assembly 10 includes a mechanism that applies a preload to bias the members away from each other to take up any backlash. The illustrated assembly 10 is used with a threaded drive shaft, for example, a lead screw S such as that shown in FIG. 1. Thus, in the preferred embodiment, the first and second members are nut portions 20 and 50 which are coupled to prevent rotation and have aligned threaded bores for engaging the screw S.

Figure 3:
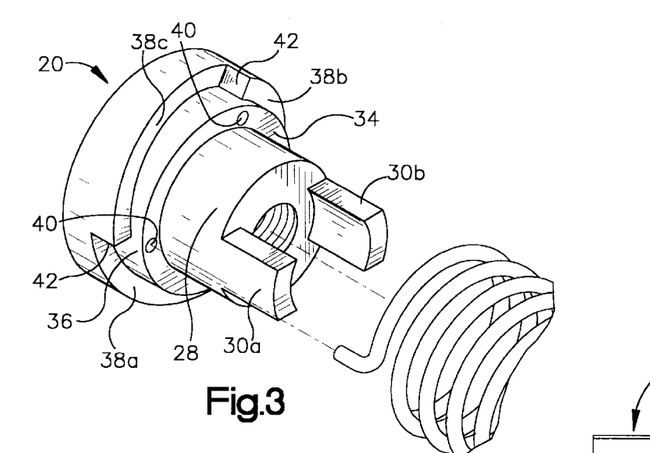
FIG. 3 is an exploded perspective view of a portion of the assembly shown in FIG. 1.
Figure 5:
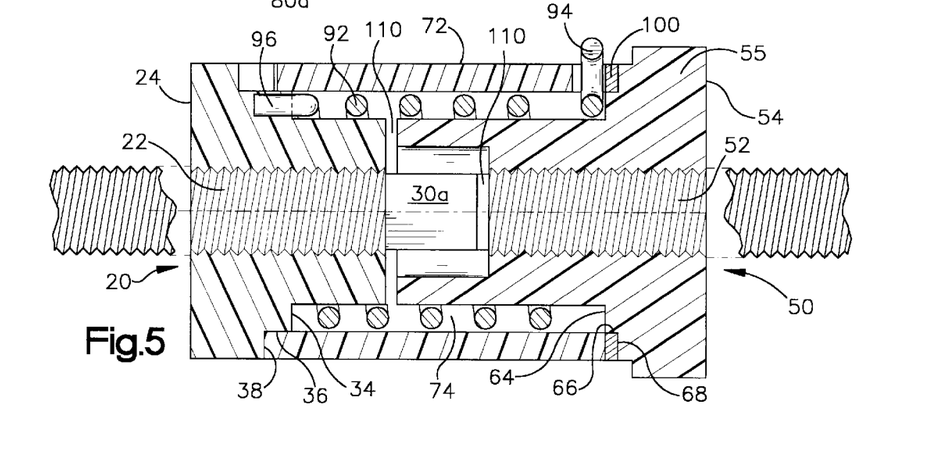
FIG. 5 is a sectional view of the assembly shown in FIG. 4 taken along lines 5—5 in FIG. 4.
Figures 6, 7:
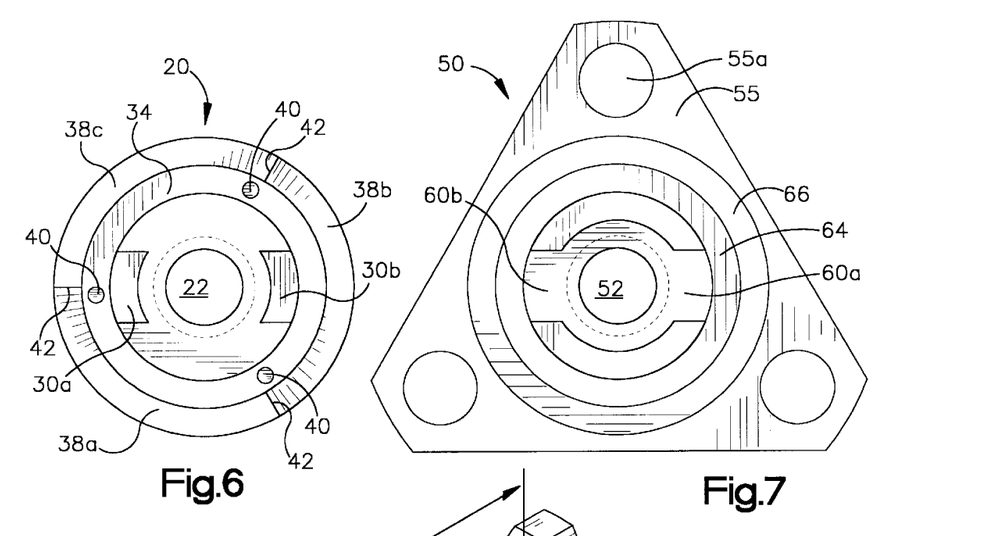
FIG. 6 is an end elevation view of a portion of the assembly of FIG. 1, as seen in the direction of lines 6—6 in FIG. 2.
FIG. 7 is an end elevation view of a portion of the assembly of FIG. 1, as seen in the direction of lines 7—7 in FIG. 2.

The first nut portion 20 includes a threaded bore 22 that preferably extends from one end 24 of the nut portion to an opposite end 26. The end 24 has a flat outer face and the end 26 comprises a cylindrical boss 28. The nut portion 20 carries structure for being non-rotatably coupled to the nut portion 50. In the illustrated embodiment such structure comprises a pair of locking projections 30a, 30b extending from the boss 28. The nut portion 20 has a stepped configuration intermediate the ends 24 and 26 which, as best seen in FIGS. 3, 5 and 6, comprises an inner rim 34 extending radially from the boss 28, an axial portion 36 extending from the rim 34, and an outer rim 38 extending radially from the portion 36. The inner rim 34 is provided with one or more apertures 40. In the illustrated embodiment, one of the apertures 40 cooperates with a preload mechanism that forces the nut portions 20 and 50 away from each other in an axial direction. The apertures 40 (or alternative structure) in the nut portion may be formed by any suitable means, for example, by being integrally molded with the nut portion, machined, etc.

In the illustrated embodiment the outer rim 38 of the portion 20 includes at least one cam surface for cooperating with the mechanism that forces the nut portions away from each other. The outer rim 38 is preferably provided with three ramps 38a–38c which extend around the nut portion 20 in a helical manner and are joined at axial walls 42. It should be recognized that an alternative number or configuration of cam surfaces could be provided on the nut portion 20. For example, only one cam surface could be used, the surface extending either partially or completely around the nut portion 20. Also, the cam surface(s) could be provided on the outer rim 38 or another area of the nut portion 20. Further, while the cam surface is preferably integrally formed with the nut portion 20, e.g., by molding, it could alternatively be provided by a separate member secured to the nut portion. While the cam surfaces depicted in the figures have a 90° corner, smoothed or rounded corners could instead be utilized, for example, to permit side machining with an end mill.

As best seen in FIGS. 2, 5 and 7, the second nut portion 50 includes a threaded bore 52 that preferably extends from one end 54 of the nut portion to an opposite end 56. The end 54 preferably is provided with a mounting bracket 55 having apertures 55a for attaching the assembly 10 to a machine component that is to be moved upon rotation of the screw S. The mounting bracket 55 may be integrally formed, e.g., by molding, as part of the nut portion 50; however, the bracket could also be a separately formed member either permanently or removably attached to the nut portion 50, for example, by a threaded connection.

The end 56 of the nut portion 50 carries structure for being non-rotatably coupled to the nut portion 20. In the illustrated embodiment the nut portion 50 comprises a cylindrical boss 58 which defines a pair of locking projections separated by recesses 60a, 60b configured to receive the locking projections 30a, 30b of the nut portion 20. The locking projections 30a, 30b and recesses of the nut portion 20 respectively engage the recesses 60a, 60b and projections of the nut portion 50 to prevent relative rotation of the two nut portions. The projections 30a, 30b, however, are slidable within the recesses 60a, 60b so that the nut portions 20 and 50 are movable relative to each other in an axial direction, thereby permitting the nut portions to be moved axially relative to the screw S to compensate for backlash.

The projections 30a, 30b may fit tightly within the recesses 60a, 60b such that no play exists between the respective components, i.e., the projections 30a, 30b cannot move angularly relative to the boss 58. It may, however, be desirable to form the nut portions so that the projections 30a, 30b fit somewhat loosely within the recesses 60a, 60b so that a slight amount of relative angular movement exists between the nut portions 20 and 50. Allowing such angular movement may be useful in reducing the drag torque requirements of the assembly. For example, if each time the screw rotation direction is reversed the nut portions are free to rotate a slight amount relative to each other, the preload on the nut portions would be reduced, and thus the motor torque requirements would be reduced. However, the effect of such play on system resolution should be considered as increased play may affect the ability to precisely control the position of the assembly.

The nut portion 50, intermediate the ends 54 and 56, has a stepped configuration, as best seen in FIGS. 2 and 5. In particular, the nut portion 50 includes an inner rim 64 extending radially outward from the boss 58, an axial portion 66 extending from the rim 64, and an outer rim 68 extending radially from the portion 66. The outer rim 68 forms a seat that receives an elastomeric washer 100 in the preferred embodiment. The washer 100 may be desirable to allow for inconsistencies or irregularities in the assembly, for example, in the threads of a lead screw. Also, the washer 100 serves to increase friction between the nut portion 50 and a preload applying mechanism.

The nut portions 20 and 50 preferably are formed of any suitable material and, in a preferred embodiment, are constructed from a low wearing self-lubricating plastic which may be injection molded, such as Acetal.

The invention comprises a mechanism for applying a preload that forces the first and second members of the assembly away from each other in an axial direction in order to compensate for backlash. The preferred mechanism comprises a sleeve which forces the members away from each other. The mechanism includes means for rotatively biasing the sleeve with respect to the first and second members. As seen in FIGS. 1 and 2, the first and second nut portions 20 and 50 are separated by a sleeve 70 that is preferably formed of a rigid or substantially rigid material to increase the axial stiffness of the assembly. The preferred and illustrated means for rotatively biasing the sleeve comprises a resilient member, such as a spring 90; however alternative resilient members could be used, e.g., a rubber band. In the illustrated application the invention thus compensates for backlash between the threads of the nut portions 20 and 50 and the threads of the screw S.

Figure 4:
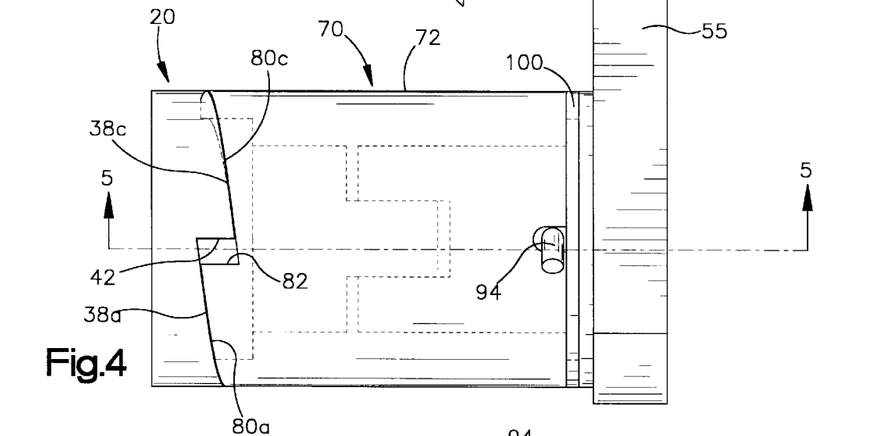
FIG. 4 is a front elevation view of the assembly of FIG. 1 with the assembly shown in an extended backlash compensating position.

The sleeve 70 preferably is a cylindrical member having an exterior surface 72 and a bore 74 extending between a first end 76 and a second end 78. The end 76 has a flat configuration and contains at least one notch or cutout 77 that receives an end of the spring 90 received in the sleeve 70; however, it should be recognized that alternative spring attachment structure or locations could be used. Also, the opening could be integrally formed in the sleeve, machined, sintered, etc. The end 78 of the sleeve has at least one cam surface configured to mate with the corresponding cam surface formed on one of the nut portions. In the illustrated embodiment, three cam surfaces in the form of ramps 80a–80c are located on the end 80 of the sleeve. The ramps 80a–80c are formed in a helical manner with the end of each ramp joined to the start of an adjacent ramp by an axial wall 82. The ramps 80a–80c on the sleeve 70 engage the ramps 38a–38c located on the end 26 of the nut portion 20 in a camming relationship, as seen in FIGS. 1 and 4.

As described above with respect to the nut member 20, the sleeve 70 could be provided with only one cam surface extending either partially or completely around the sleeve. Similarly, the cam surface(s) could be provided on the end 80 or another portion of the sleeve 70. In addition, while the cam surface is preferably integrally formed with the sleeve, it could alternatively be provided by a separate member secured to the sleeve. Also, while the cam surface(s) on the sleeve 70 preferably has either an identical or substantially identical configuration as the cam surface on the nut portion 20, the respective surfaces may have a different configuration and still achieve application of the preload.

The spring 90 is received within the sleeve 70 and comprises, in the preferred embodiment, a torsion spring including a plurality of coils 92 and opposite end tangs 94, 96. The spring 90 surrounds the locking projections 30a, 30b of the nut portion 20 and the recesses 60a, 60b of the nut portion 50. See FIG. 5. One end of the spring 90 is located adjacent the inner rim 34 of the nut portion 20 while the other end is located adjacent the inner rim 64 of the nut portion 50. The tang 94 of the spring 90 is received in the notch 77 formed in the sleeve 70, while the tang 96 is received in the aperture 40 formed in the inner rim 34 of the nut portion 20. Consequently, by loading the spring 90 upon assembling the backlash compensating assembly 10, the spring biases the sleeve 70 rotatively with respect to the nut portion 20 (and the nut portion 50 locked thereto).

Accordingly, the sleeve 70 and spring 90 cooperate to apply a preload that forces the nut portions 20 and 50 away from each other in an axial direction. As seen in FIG. 4, when the sleeve 70 is rotated relative to the nut portions (in a downward direction as viewed in FIG. 4) the ramps 80a–80c of the sleeve cam against the ramps 38a–38c of the nut portion 20, with the respective axial walls 42, 82 of the nut portion 20 and the sleeve 70 moving away from each other as a result. This forces the nut portions 20 and 50 away from each other, as seen in FIG. 5 which shows the space 110 formed between the nut portions in an axial direction. Thus, for example, as the threads of the nut portion 20 or 50 wear, for example as often occurs if the nut portions are plastic and the screw is metal, the sleeve 70 automatically rotates to move the nut portion 20 axially with respect to the nut portion 50. This forces the threads of the nut portions 20, 50 tightly against the threads of the screw S to eliminate backlash. As a result, the position of the nut assembly can be detected and controlled very precisely.

In the preferred embodiment the sleeve 70 is formed of a rigid material such as metal, e.g. stainless steel. In some applications, for example those involving high temperature environments, it may be desirable to form the sleeve 70 of a material possessing a lower coefficient of thermal expansion than the material from which the nut portions are formed. This would prevent expansion of the sleeve resulting in undue tightening or binding of the assembly. For example, for cost and manufacturing reasons, the sleeve could be formed of a suitable plastic (which undergoes a relatively small degree of thermal expansion). The assembly preferably is designed so that the respective components, through selection of appropriate materials, undergo a substantially even amount of thermal expansion.

Figure 8A:
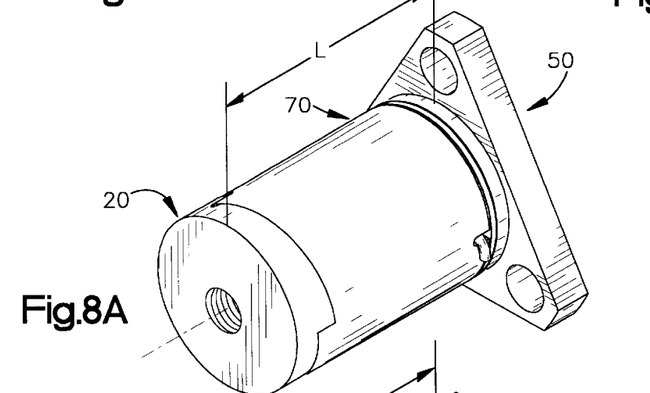
FIGS. 8A and 8B are perspective views schematically illustrating the assembly of FIG. 1 in different positions.
Figure 8B:
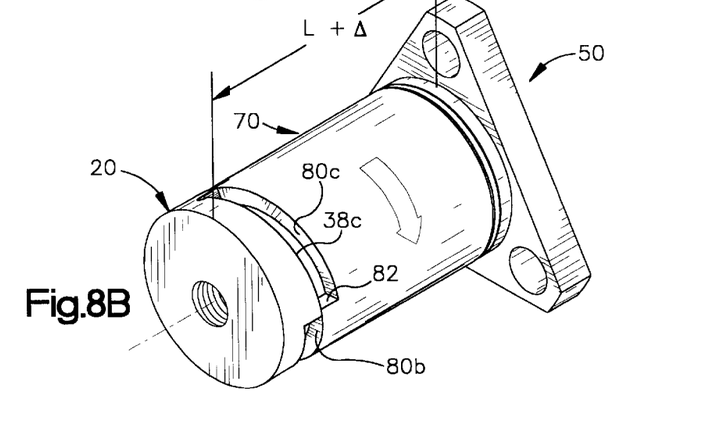

FIGS. 8A and 8B illustrate the assembly in two different positions. In the position shown in FIG. 8A, the sleeve 70, though applying a preload, has not rotated relative to the nut portions 20 and 50. Thus, the axial walls 82 of the sleeve 70 are flush against the axial walls 42 of the nut portion 20. In the position shown in FIG. 8B, however, the sleeve has rotated (as indicated by the arrow) relative to the nut portions 20 and 50. Accordingly, the ramps 80a–80c of the sleeve 70 cam the ramps 38a–38c of the nut portion 20 in an outward direction due to the sleeve rotating to the position shown in FIG. 8B. As a result, the nut portion 20 moves axially away from the nut portion 50 by a distance $\Delta$ that is sufficient to take up any backlash which, in the illustrated embodiment, exists between the threads of the nut portions and the threads of the screw S.

The mating ramps on the nut portion 20 and the sleeve 70 preferably follow a helical path and form a desired angle with respect to the end surface 24 of the nut portion (FIG. 4). The specific angle of the ramps may be selected depending on the particular application. Additionally, the helical ramps preferably, though not necessarily, are of the same hand as the threads of the screw S. It should be recognized that the angle of the ramps carried by the one nut portion and the sleeve, as well as the number and shape of the ramps, may be varied depending on the particular application.

Figures 9, 10, 11:
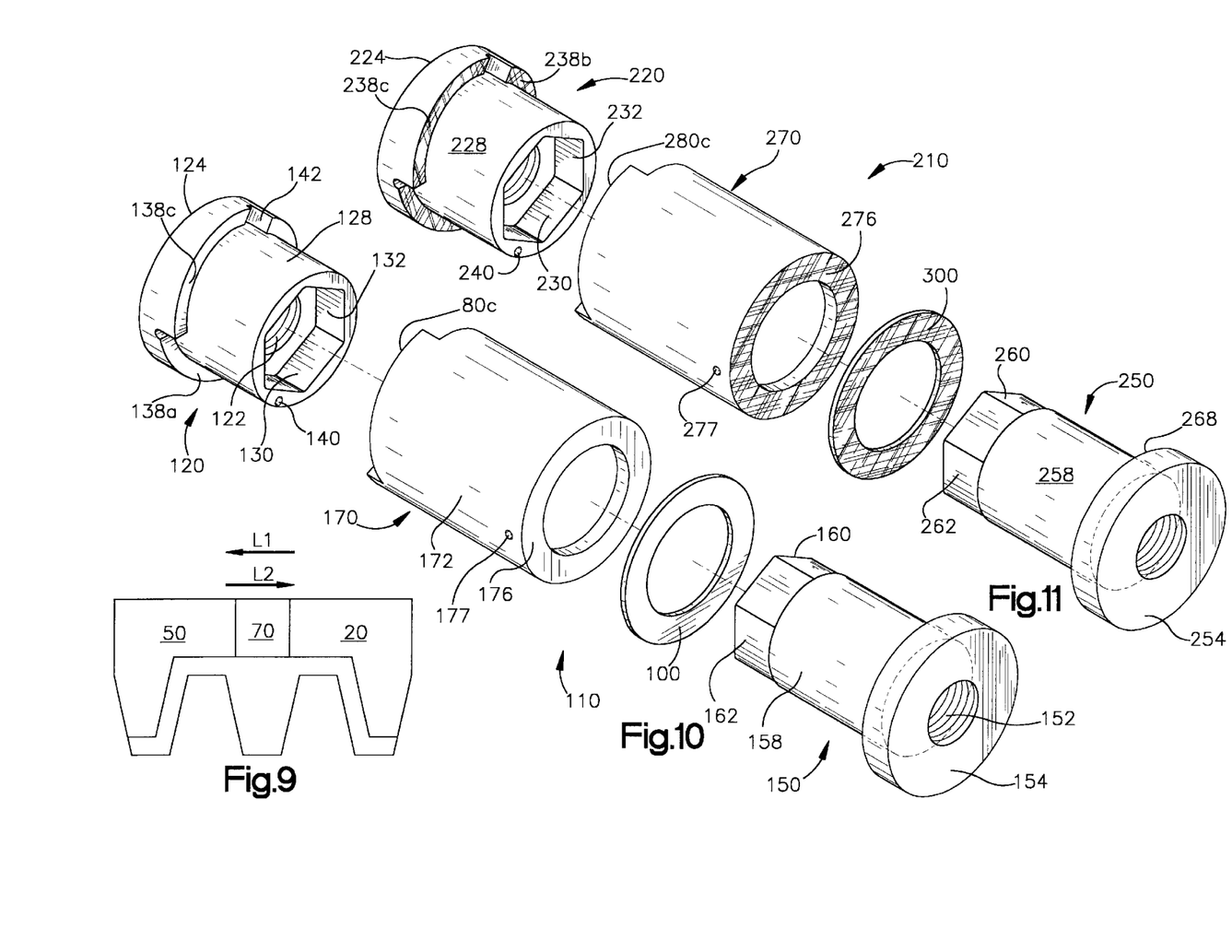
FIG. 9 is a schematic illustration of the assembly of FIG. 1.
FIG. 10 is a perspective view of a backlash compensating assembly constructed according to an alternative embodiment of the invention.
FIG. 11 is a perspective view of a backlash compensating assembly constructed according to another alternative embodiment of the invention.

FIG. 9 depicts in schematic fashion an anti-backlash assembly of the invention including nut portions 20 and 50. If the nut portion 50 is connected to the component to be moved by the assembly (for example, by the bracket 55), driving the assembly against a load L1 results in the screw exerting force against the flank of the nut portion 50. These forces (compression and torsional) from the screw act directly on the nut portion 50 and are not passed through the assembly. However, driving the assembly against a load L2 results in the screw exerting force against the flank of the other nut portion 20, which nut portion is free to move in the sense that it is not connected to the driven component as is nut portion 50. As a result, the screw force exerted on nut portion 20 must be passed through the assembly.

The simple axial compression forces acting on the nut portion 20 are passed to the nut portion 50 by the sleeve 70. All of these compression forces will be passed by the sleeve 70 as long as the angle of the mating ramps on the nut portion 50 and sleeve is such that the compression forces do not cause the sleeve to rotate or back up relative to the nut portion, taking into consideration that friction between the nut portion and sleeve will aid in preventing such rotation. While there may be some deflection within the elastomeric washer 100, utilizing the sleeve 70 to pass all of the compressive load through the assembly is desirable as it ensures better positional accuracy of the assembly. The sleeve may be used to pass all the compressive load in various applications including those utilizing different ramp angles and materials having different coefficients of friction.

The torsional forces acting on the nut portion 20 also are preferably passed to the nut portion 50 by the sleeve 70. All of the torsional forces will be passed by the sleeve 70 as long as the nut portion 20 does not rotate relative to the sleeve 70, and the nut portion 20 and sleeve 70 do not rotate as a unit relative to the nut portion 50. However, if either of these two conditions occurs, then the non-rotatable coupling between the nut portions will take the portion of the torsional load not carried by the sleeve. It is desirable to have the sleeve take all of the torsional load to ensure high resolution by avoiding any lost motion that may occur when torque is passed through the coupling, for example, due to relative movement between the nut portions caused by twisting at the coupling structure. Further, if all the load is passed through the sleeve then it is not necessary to utilize a stiff non-rotatable coupling having sufficient strength to assume some of the load. It should, however, be appreciated that the invention may be practiced by passing either all or some of the load through the sleeve.

Therefore, it may be desirable to provide an assembly with a nonrotatable coupling that is capable of bearing the torsional load, either by design or as a result of slippage between the sleeve and nut portions. FIG. 10 illustrates an embodiment of the invention comprising a high strength coupling. The assembly 110 comprises nut portions 120, 150 and a sleeve 170 disposed therebetween. The nut portion 120 includes a threaded bore 122, a flat end surface 124, and a cylindrical boss 128. The boss 128 terminates in a flat peripheral surface surrounding a recess 130 forming part of the nonrotatable coupling structure. The recess 130 is polygonal and includes side surfaces 132 configured to mate with corresponding structure on the nut portion 150. The peripheral surface surrounding recess 130 preferably is provided with one or more apertures 140 that receive the end of a spring (not shown in FIG. 10) which rotatively biases the sleeve 170 to force the nut portions 120 and 150 away from each other in an axial direction. For sake of clarity, the spring is not shown in FIG. 10 but would be constructed and perform the function as described above with respect to the spring 90. The apertures (or alternative structure) for attaching the spring may be formed as described above with respect to the previous embodiment.

The nut portion 120 includes at least one cam surface for cooperating with the sleeve 170. As seen in FIG. 10, three ramps 138a–138c extend around the nut portion 120 in a helical manner and are joined at axial walls 142. As in the previous embodiments an alternative number or configuration of cam surfaces could be provided on the nut portion 120.

The second nut portion 150 includes a threaded bore 152, a flat end surface 154 and a cylindrical boss 158. The end 154 preferably is provided with structure (not shown in FIG. 10) for attaching the assembly 110 to a machine component that is to be moved upon rotation of the drive screw. The boss 158 terminates in an extension 160 having a polygonal exterior defining side surfaces 162 configured to mate with the side surfaces 132 of recess 130 of the nut portion 120. The extension 160 locks in the recess 130 to non-rotatably couple the nut portions 120, 150.

The sleeve 170 has ramps 80a–80c which cam the ramps 138a–138c on the nut portion 120 as described above with respect to the previous embodiments. The sleeve 170 has a surface 176 at its end located opposite the end with the ramps 80a–80c. An aperture 177 is provided on the sleeve at a suitable location to receive the end of the spring (not shown) which rotatively biases the sleeve 170 with respect to the nut portions. Also, an elastomeric washer 100 preferably is provided between the nut portion 150 and the sleeve 170 as in the previous embodiments.

The extension 160 and recess 130 serve to non-rotatably couple the nut portions 120 and 150 and provide a strong locking engagement that will not slip to any extent should the coupling be required to pass any load from one nut portion to the other. While the recess 130 and extension 160 have a hexagonal configuration, it should be recognized that other configurations may be used to non-rotatably couple the nut portions in a secure manner capable of supporting any load occurring during normal operation.

Another advantage of the coupling structure of the embodiment of FIG. 10 is that during assembly one nut portion may be rotated incrementally with respect to the other nut portion. This provides added flexibility in assembling the two nut portions which may be useful, for example, if the portions are separately manufactured or constructed.

According to another aspect of the invention, the anti-backlash assembly may be modified in several respects to ensure that the sleeve transmits all the compressive and torsional load from the one nut portion to the other. This preferred characteristic can be achieved by selecting particular ramp angles and utilizing friction forces between the sleeve and the nut portions. The friction between these components can be enhanced through utilization of materials possessing relatively high friction coefficients and/or by subjecting the mating surfaces of the components to various treatments that produce increased frictional engagement between the components.

FIG. 11 depicts an embodiment of the invention comprising two nut portions 220, 250 and a sleeve 270. The nut portion 220 includes a threaded bore, a flat end surface 224, and a cylindrical boss 228. The boss 228 terminates in an apertured flat peripheral surface surrounding a recess 230 defining side surfaces 232 forming part of a non-rotatable coupling structure that is configured as discussed above with respect to the embodiment shown in FIG. 10. One or more apertures 240 in nut portion 220 receive the end of a spring (not shown in FIG. 11) which rotatively biases the sleeve 270 to force the nut portions 220 and 250 away from each other in an axial direction. The nut portion 220 includes three ramps 238a–238c that cooperate with ramps 280a–280c formed on the sleeve 270 as discussed above.

The second nut portion 250 includes a threaded bore, a flat end surface 254 and a cylindrical boss 258. The end 254 preferably is provided with mounting structure (not shown in FIG. 11) for attaching the assembly 210 to a machine component that is to be moved upon rotation of the drive screw. The boss 258 terminates in an extension 260 having a polygonal exterior defining side surfaces 262 configured to mate with the side surfaces 232 of recess 230 of the nut portion 220, the extension 260 locking in the recess 230 to non-rotatably couple the nut portions 220, 250.

The sleeve 270 has a surface 276 at its end located opposite the end with the ramps 280a–280c, and an aperture 277 that receives the end of the spring (not shown) which rotatively biases the sleeve 270 with respect to the nut portions. An elastomeric washer 300 preferably is provided between the nut portion 250 and the sleeve 270 as in the previous embodiments.

In order to increase the frictional engagement between the various components of the assembly 210, selected surfaces of the components are provided with means for enhancing the friction characteristics thereof In particular, as indicated in FIG. 11, the ramps 238a–238c of nut portion 220 and the ramps 280a–280c of sleeve 270 have roughened surfaces that cooperate to increase friction between the nut portion and the sleeve. The surfaces can be roughened or textured, for example, by knurling, sand blasting, during molding of the parts, etc. As an alternative to roughening the mating surfaces, the surfaces could include geometric alterations that cooperate to further lock the nut portion 220 and sleeve 270 together. Additionally, the ramps of only one or both of the nut portion 220 and the sleeve 270 may be provided with means for enhancing friction.

Similarly, the surface 276 of the sleeve 270 and the opposite surfaces of the washer 300 are provided with means for enhancing the frictional engagement between the components, as is the surface 268 at the base of the nut portion 250 which engages the washer 300. Increasing the friction between the components ensures that torsional load exerted against the nut portion 250 results in no relative movement between the sleeve 270 and either nut portion (or, alternatively, a small amount of relative movement within predetermined limits). This ensures that when load must be transmitted through the assembly the components lock-up and provide positional accuracy.

The angle of the mating ramps on the nut portion and the sleeve also affects the extent to which the components lock up when loading must be passed through the assembly. Increasing the ramp angle further prevents relative rotation of the nut portions and the sleeve; however, if the angle is too great there is a possibility that axial loading of the assembly will cause the sleeve ramps to back down the ramps on the nut portion, or the nut portion rotating down the sleeve ramps during deceleration. As such, the ramp angle and degree of frictional engagement between the components may be selected to achieve the desired amount of interlocking between components.

Figure 12A:
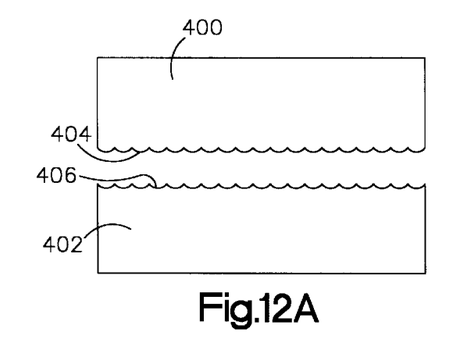
FIGS. 12A–12D are schematic views of additional embodiments of the invention wherein alternative surface treatments are applied to various components of the assembly.
Figure 12B:
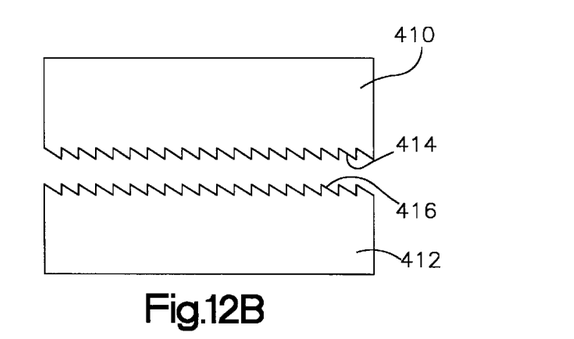
Figure 12C:
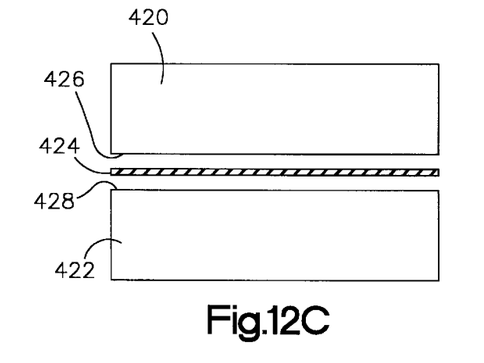
Figure 12D:
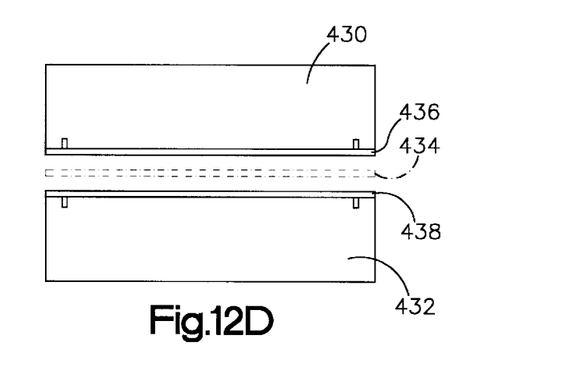

FIGS. 12A–12D depict in schematic fashion alternative means for enhancing the friction between components of the assembly. FIG. 12A shows first and second components 400, 402 which correspond to any mating components of the assembly, e.g., the nut portions, sleeve, and washer. The components 400, 402 are provided with mating grooves 404, 406 which serve to lock the components together. In FIG. 12B the components 410, 412 are provided with mating serrations 414, 416, such as ratchet teeth, which lock the components together. In FIG. 12C the components 420, 422 have confronting surfaces 426, 428 that engage an intermediate member 424 formed of (or coated with) a material having a high coefficient of friction, e.g., an elastomeric washer, the member 424 serving to lock the components together. In FIG. 12D the components 430, 432 have confronting surfaces provided with inserts or layers 436, 438 formed of (or coated with) a material having a high coefficient of friction. The inserts 436, 438 engage each other with considerable friction to lock the components together. In addition, an intermediate member 434 (shown in phantom) having a high coefficient of friction may be disposed between the components 430, 432 to further increase the force preventing relative movement therebetween.

Figures 13, 14:
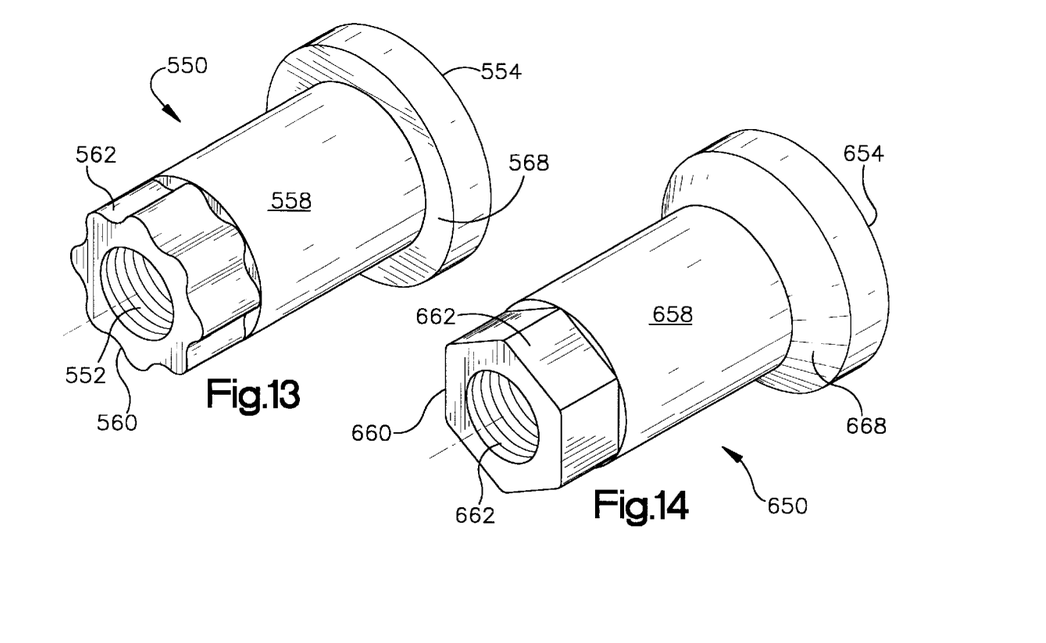
FIG. 13 is a perspective view of a member forming part of a backlash compensating assembly constructed according to another alternative embodiment of the invention.
FIG. 14 is a perspective view of a member forming part of a backlash compensating assembly constructed according to another alternative embodiment of the invention.

FIG. 13 depicts a nut portion 550 provided with an alternative nonrotatable coupling structure. The nut portion 550 comprises a bore 552, a flat end surface 554, and a cylindrical boss 558. The boss 558 has at its end a locking member 560 the exterior of which includes an undulating surface 562. The surface 562 is configured to mate with complementarily configured coupling structure formed in the other nut portion (not shown). The nut portion 550 may be provided with means for enhancing friction between the components, for example, by roughening the surface 568 for engaging a washer (not shown) disposed between the sleeve (not shown) and the nut portion 550. As discussed above with respect to the embodiment shown in FIG. 10, the multi-sided surface 562 on locking member 560 of the one nut portion and the complementarily shaped recess in the other nut portion provide added flexibility by permitting incremental relative adjustment of the nut portions during assembly.

FIG. 14 depicts a nut portion 650 provided with an alternative means for enhancing friction at the interface of the nut portion and the sleeve or washer (not shown) of the assembly. The nut portion 650 comprises a bore 652, a flat end surface 654, a cylindrical boss 658, and non-rotatable coupling structure 660, 662. The nut portion 650 has adjacent its end 654 an inclined surface 668 which mates with an end of the sleeve having a corresponding inclined surface (not shown). If desired, a washer could be positioned between the mating inclined surfaces. The mating inclined surfaces, e.g., disposed at a 45° incline, of the nut portion and the sleeve further enhance the frictional engagement between the components to ensure that the assembly locks up under load, thereby ensuring positional accuracy and high resolution. Also, an inclined surface such as that shown in FIG. 14 could be provided on the opposite, cam end of the sleeve or the other nut portion to increase friction at the junction thereof.

As discussed above, although not necessary to practicing the invention, it is preferred that the preload applying mechanism (the sleeve in the illustrated embodiments) transmit all of the load through the assembly to avoid lost motion occurring at the non-rotatable coupling between the first and second members (the nut portions in the illustrated embodiments). One assembly that achieved this result was used with a ⅜" lead screw with a 0.100" lead (approximately 6° screw helix angle) and comprised two nut portions formed of lubricated Acetal, e.g. Dupont Delrin AF, and a stainless steel sleeve. The first nut portion and the sleeve were provided with 9° ramps and the sleeve transmitted all of the load through the assembly with substantially no lost motion (and only a slight amount of torsional deflection at the resilient washer located between the sleeve and the second nut portion). The non-rotatable coupling was not required to carry any load.

The backlash compensating assembly of the invention may be utilized to reduce or eliminate backlash in various types of devices. In the preferred application including a pair of threaded nut portions and a rotatable screw, the assembly will serve to take up backlash upon initially installing the assembly on the screw, as well as backlash that may arise due to thread wear of any of the components.

Although the invention has been described in its preferred form with a certain degree of particularity, it is understood that the present detailed disclosure is made only by way of example and that numerous changes in the details of construction, operation and the combination and arrangement of parts may be made without departing from the spirit or scope of the invention as hereinafter claimed.

What is claimed is:

1. An apparatus comprising:

a first member having a bore;

a second member having a bore;

the first and second members coupled to prevent relative rotation but permit relative axial movement, said bores being aligned along an axial direction;

a sleeve positioned between the first and second members and rotatable relative to the first and second members, the sleeve having an end including a cam surface abutting a surface of one of the first and second members; and a resilient member secured to the sleeve and one of the first and second members, the resilient member biasing the sleeve to rotate with respect to first and second members to cause said cam surface of the sleeve to engage said surface of the one member and move said one member with respect to the other member in said axial direction.

2. An apparatus according to claim 1, wherein the cam surface comprises at least one helical ramp surface that mates with a corresponding helical ramp surface on the one member.

3. An apparatus according to claim 2, wherein the cam surface comprises a plurality of helical ramp surfaces that mate with a plurality of corresponding helical ramp surfaces on the one member.

4. An apparatus according to claim 1, wherein the resilient member is a spring and the first and second members are provided with complementary projections and recesses that interlock to prevent relative rotation between the members.

5. An apparatus according to claim 4, wherein the resilient member is a spring and the sleeve surrounds the spring and the projections and recesses of the first and second members.

6. An apparatus according to claim 1, wherein the spring has opposite ends, and one of said opposite ends is secured in a slot formed in the one member and the other of said opposite ends is secured in a slot formed in the sleeve.

7. An apparatus according to claim 1, wherein one of the first and second members includes a mounting bracket with a plurality of apertures.

8. An apparatus according to claim 1, wherein the first and second members are formed of plastic and the sleeve is formed of a material having a lower coefficient of thermal expansion than said plastic.

9. An apparatus according to claim 1, further comprising an elastomeric member disposed between the sleeve and the other of the first and second members.

10. An apparatus according to claim 1, further comprising means for enhancing frictional engagement provided on at least one of the first and second members and the sleeve.

11. A nut assembly according to claim 1, wherein the bores of the first and second nut portions are threaded and further comprising a rotatable threaded shaft engaged with said threaded bores.

12. An apparatus according to claim 1, wherein one of the first and second members is provided with an extension having a polygonal exterior and the other member is provided with a complementarily-shaped recess receiving the extension.

13. A nut assembly comprising:

a first nut portion having a threaded bore;

a second nut portion having a threaded bore and coupled to the first nut portion to prevent relative rotation but permit movement in an axial direction;

a substantially rigid sleeve rotatable with respect to the first and second nut portions, the sleeve having one end engaging the first nut portion and an opposite end engaging the second nut portion, one of the ends of the sleeve provided with at least one ramped surface engaging at least one complimentary ramped surface provided on one of the first and second nut portions; and means for biasing the sleeve to rotate with respect to the first and second nut portions such that said ramped surfaces slide relative to each other to move said one nut portion in an axial direction with respect to the other nut portion.

14. A nut assembly according to claim 13, wherein the sleeve and said one nut portion are provided with three ramped surfaces each.

15. A nut assembly according to claim 14, wherein the ramped surfaces on the sleeve and the ramped surfaces on the one nut portion are separated by axially extending walls formed on the sleeve and the nut portion.

16. A nut assembly according to claim 13, wherein the other end of the sleeve has a flat annular ledge engaging a flat annular edge formed on the other nut portion.

17. An apparatus according to claim 12, wherein the other end of the sleeve has an inclined ledge abutting an inclined ledge formed on the other nut portion.

18. A nut assembly according to claim 13, wherein the bore of the first nut portion is axially spaced from the bore of the second nut portion, and cooperating locking elements extend between the bores of the first and second nut portions to prevent relative rotation but permit sliding movement in an axial direction.

19. A nut assembly according to claim 13, wherein the first and second nut portions and the sleeve form a generally cylindrically shaped assembly.

20. An apparatus comprising:

a threaded drive shaft;

a nut assembly threadedly engaged with the drive shaft so as to move axially upon rotation of the drive shaft, the nut assembly comprising:

a first nut portion with a bore threadedly engaged with the drive shaft;

a second nut portion with a bore threadedly engaged with the drive shaft, the bore of the first nut portion being axially aligned with the bore of the second nut portion, the first and second nut portions coupled to prevent relative rotation but permit relative movement in an axial direction;

a rotatable member disposed between the first and second nut portions, the rotatable member having at least one cam surface engaging the first nut portion wherein relative rotation of the member and the nut portions cams the first nut portion away from the second nut portion to take up backlash between the threads of the nut portions and the drive shaft; and means for biasing the member to rotate with respect to the first and second nut portions.

* * * * *